May 7, 1963  N. R. HAINES  3,088,472
VEHICLE WASHER
Filed Aug. 14, 1961  4 Sheets-Sheet 1
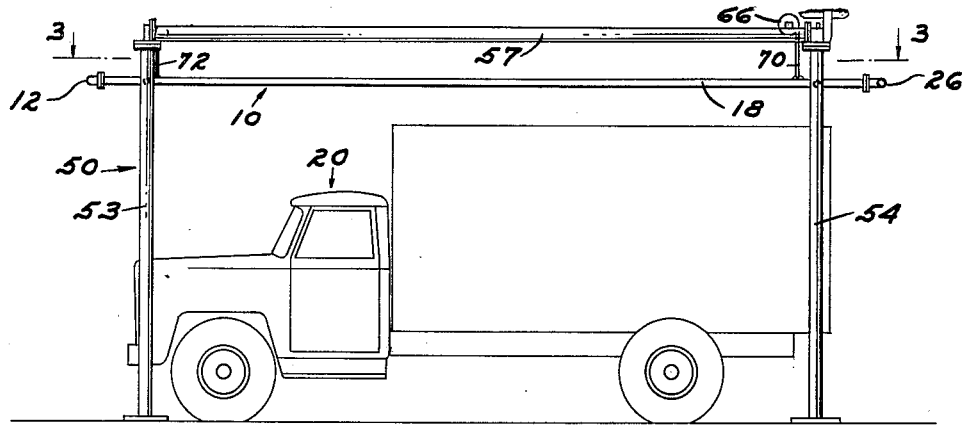
FIG. 1
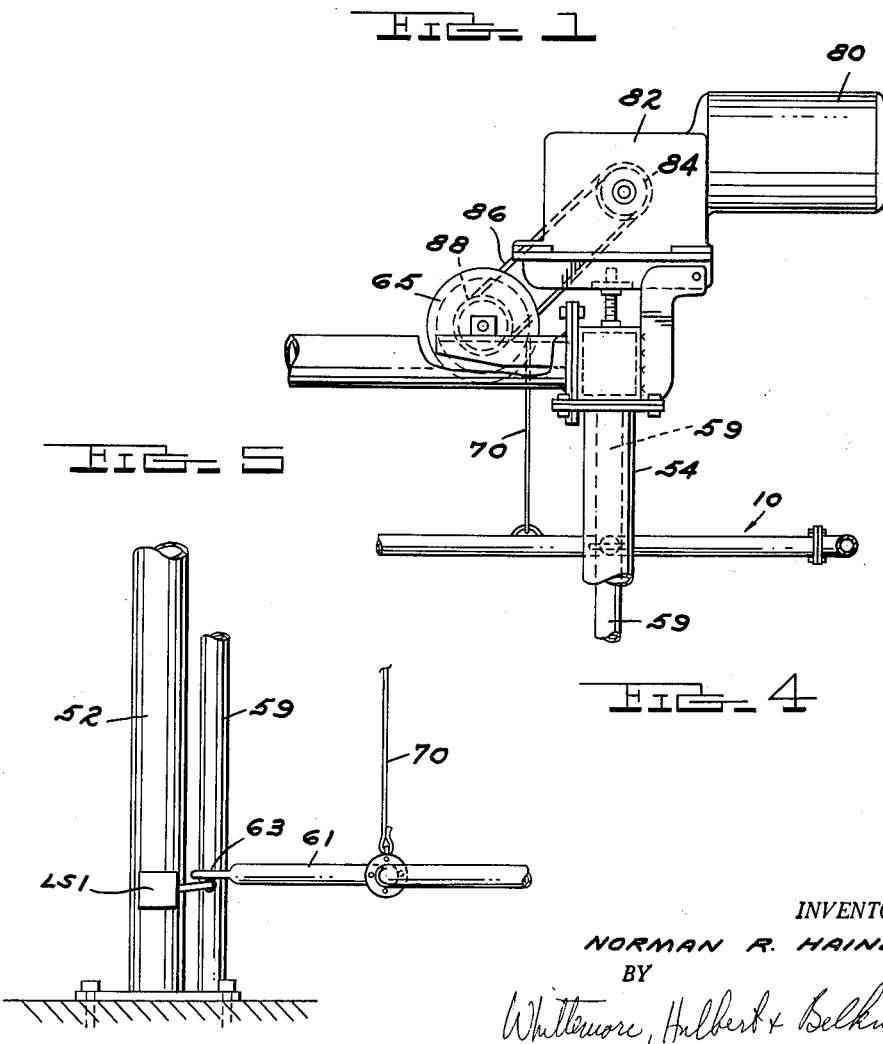
FIG. 5
FIG. 4
INVENTOR.
NORMAN R. HAINES
BY
Whittemore, Hulbert & Belknap
ATTORNEYS May 7, 1963 N. R. HAINES 3,088,472
VEHICLE WASHER
Filed Aug. 14, 1961 4 Sheets-Sheet 2
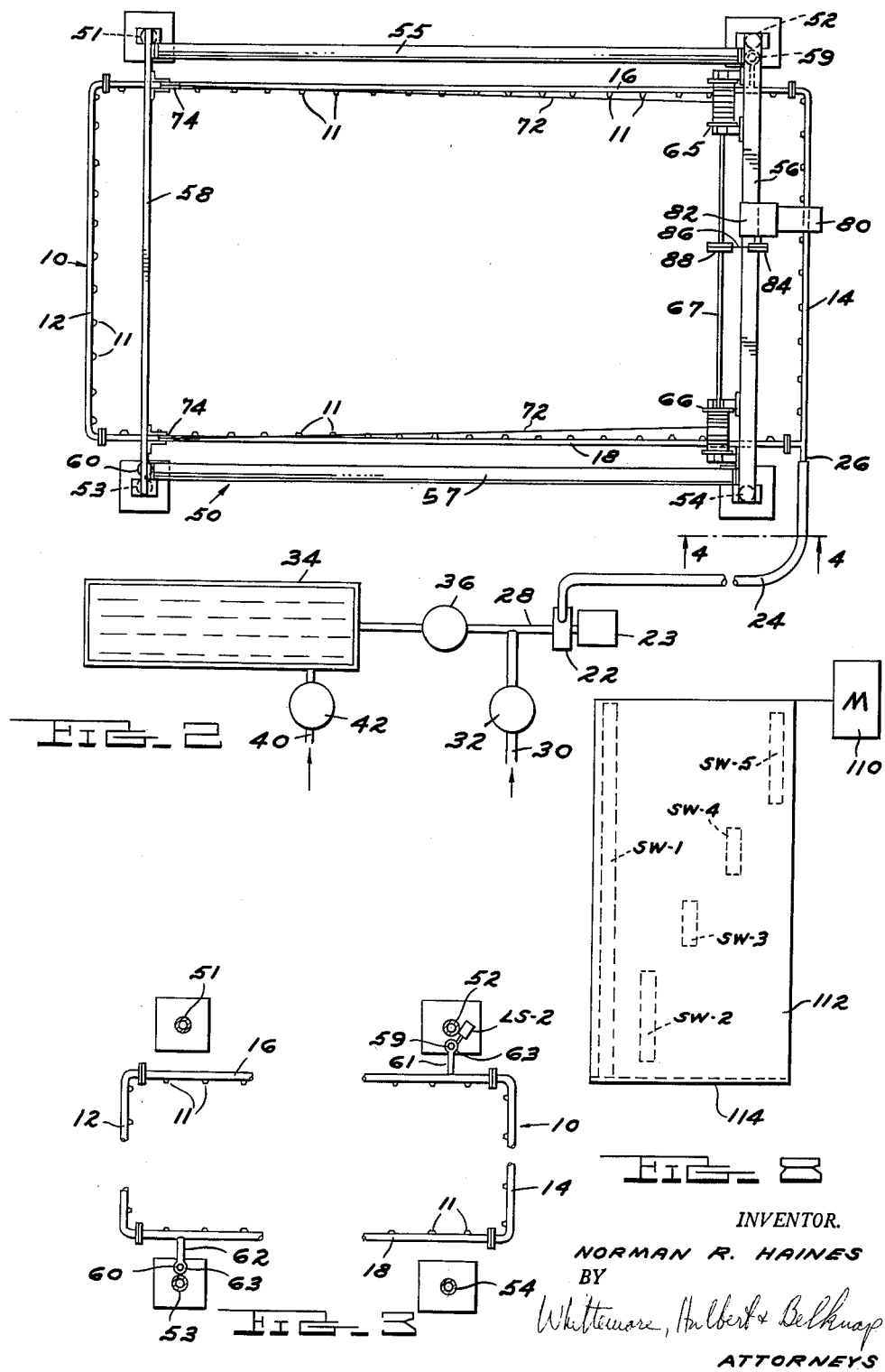
INVENTOR.
NORMAN R. HAINES
BY
Whittemore, Hulbert & Belknap
ATTORNEYS

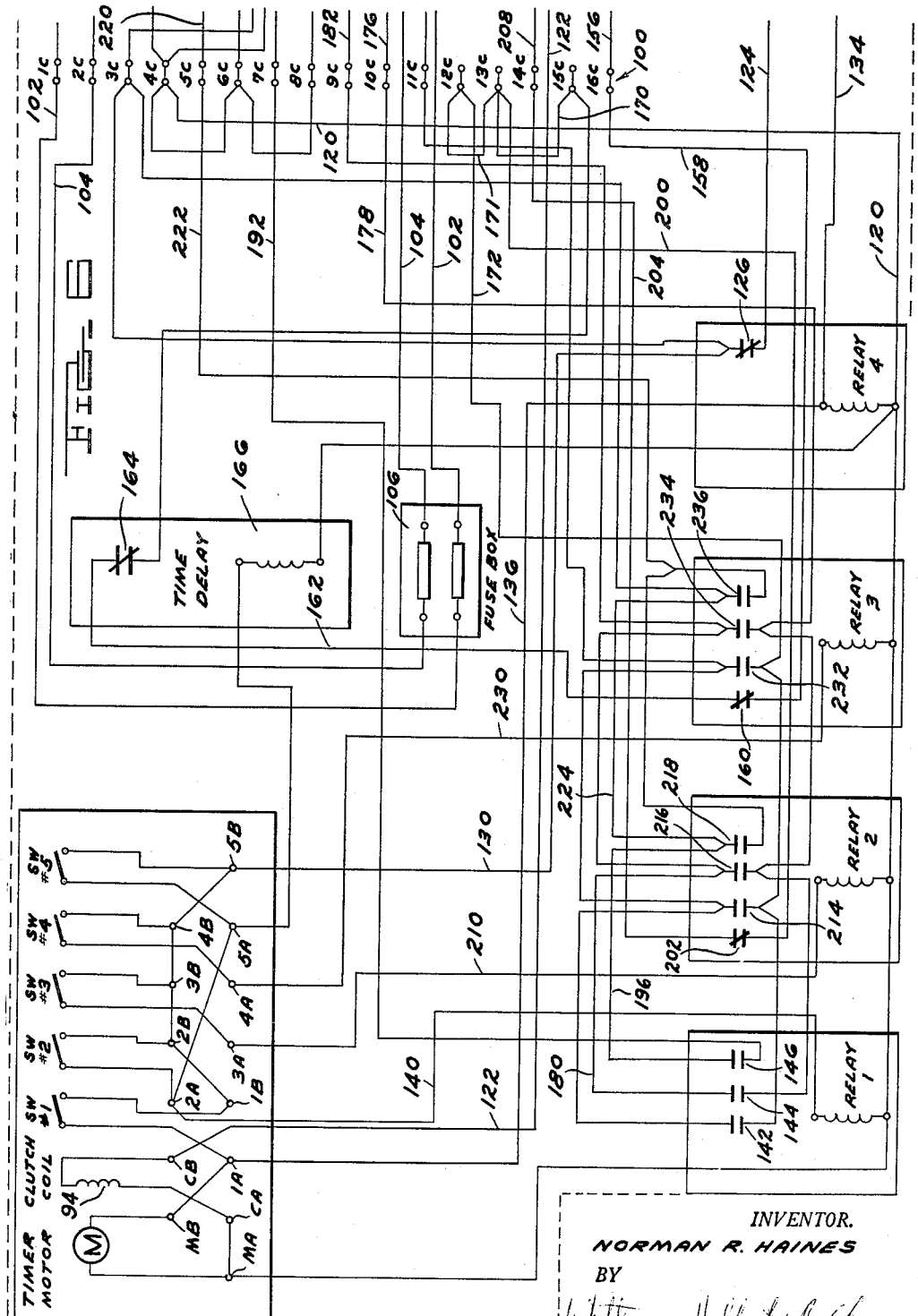

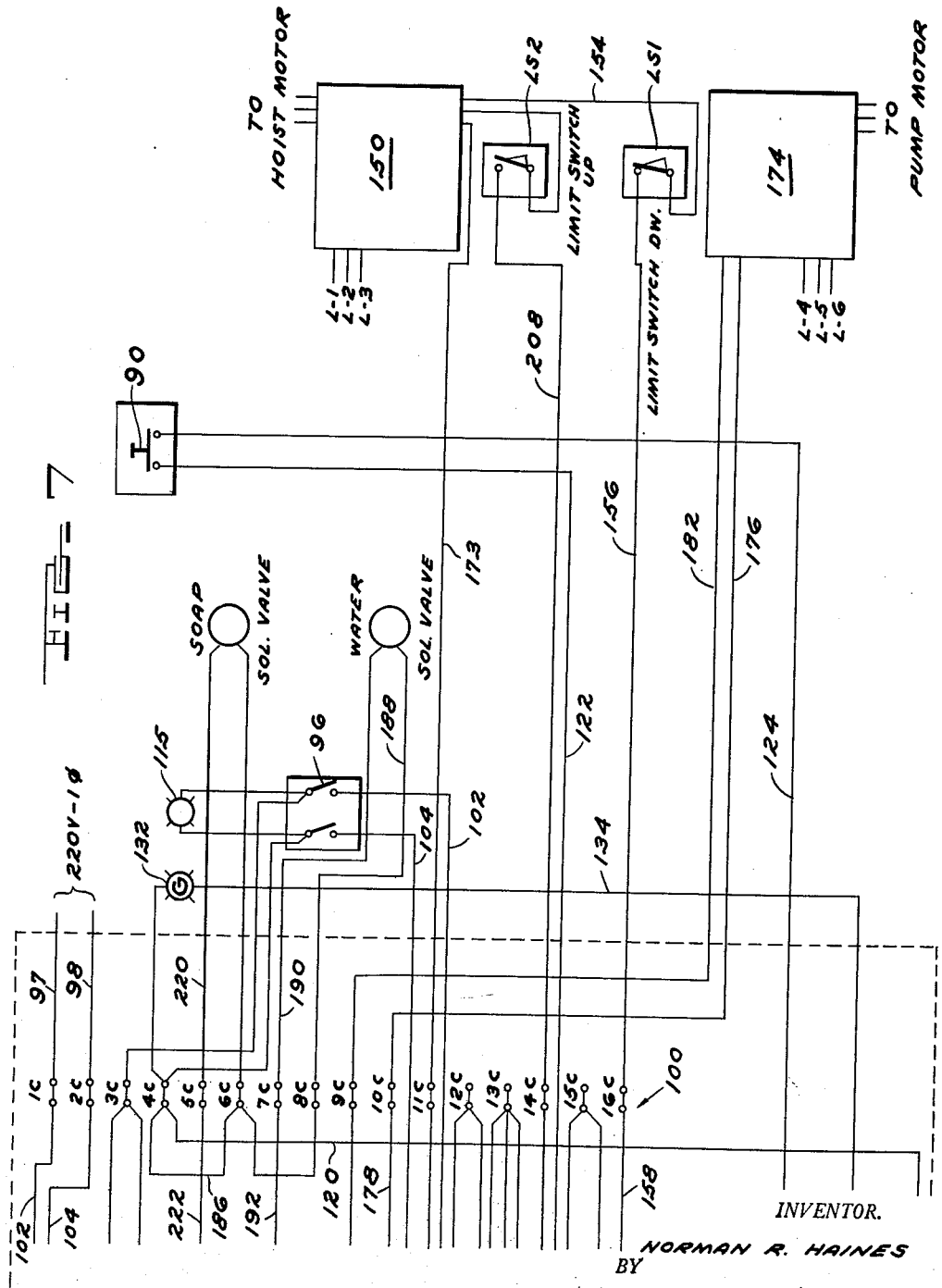

United States Patent Office 3,088,472
Patented May 7, 1963

3,088,472
VEHICLE WASHER
Norman R. Haines, Ann Arbor, Mich., assignor to Canomac Corporation, Ann Arbor, Mich., a corporation of Michigan
Filed Aug. 14, 1961, Ser. No. 131,157
12 Claims. (Cl. 134—57)

This invention relates generally to washing apparatus and refers more particularly to apparatus for washing motor vehicles.

One object of this invention is to provide a vehicle washer which is fully automatic.

Another object is to provide a vehicle washer having an automatic control for operation through a complete cycle including washing and rinsing.

Another object is to provide a vehicle washer having a reciprocable spray device and means for supplying two different liquids to the spray device automatically and in sequence during the reciprocation thereof.

Another object is to provide a vehicle washer having a reciprocable spray frame and control means for stopping the reciprocation of the spray frame at one of its limits to provide a temporary dwell in the cycle.

Another object is to provide a vehicle washer having means for supplying either one of two liquids to the spray frame during its reciprocation, and a control for automatically shutting off one liquid and starting the other at one of the limits of reciprocation.

Another object is to provide a vehicle washer having a vertically reciprocable spray frame, and a control for supplying either rinse water or a cleansing liquid such as soapy water to the spray frame, the control being operative to supply the cleansing liquid to the spray frame during one portion of the cycle and to supply rinse water during another portion of the cycle.

Another object is to provide a vehicle washer having an automatic control operative to deliver clear rinse water to the spray frame during a down and up movement thereof, to deliver a cleansing liquid to the spray frame during a subsequent down and up movement thereof, and then to again supply the spray frame with clear water to rinse the vehicle in a final down and up movement of the spray frame.

Another object is to provide a control wherein the spray frame is temporarily interrupted at its lower limit during movement thereof through the cleansing cycle.

Another object is to provide a vehicle washer in which the control provides a dwell in the movement of the spray frame after the initial rinse and also after the cleansing liquid is applied, to allow for penetration into the film of dirt on the vehicle.

Other objects and features of the invention will become apparent as the description proceeds, especially when taken in conjunction with the accompanying drawings, wherein:

FIGURE 1 is a side elevational view of apparatus embodying my invention, showing a truck in position to be washed.

FIGURE 2 is a top plan view of the apparatus shown in FIGURE 1.

FIGURE 3 is a semi-diagrammatic fragmentary sectional view on a reduced scale, taken on the line 3—3 of FIGURE 1.

FIGURE 4 is an enlarged fragmentary view taken on the line 4—4 of FIGURE 2.

FIGURE 5 is an enlarged fragmentary view of a lower corner portion of the apparatus.

FIGURES 6 and 7 together illustrate the electrical control for the apparatus.

FIGURE 8 is a diagrammatic view illustrating part of the switch mechanism.

Referring now more particularly to the drawings, the vehicle washer comprises a spray frame 10 which preferably is endless and rectangular to spray all sides of a vehicle at once. The frame 10 is provided with a plurality of inwardly directed nozzles 11 about the entire perimeter thereof to direct water inwardly in a great many jets or sprays. The ends of the spray frame are indicated at 12 and 14, and the sides at 16 and 18, the sides and ends being tubular members or pipes which are joined together at the corners to provide a continuous closed circuit or passage for water. The overall length of the spray frame exceeds slightly the overall length of a vehicle to be washed, and the width of the frame is somewhat greater than the width of the vehicle. A vehicle 20 is shown in FIG. 1 within the confines of the spray frame in position to be washed. It will be understood that longer spray frames may be provided for washing longer vehicles.

A pump 22 is provided for delivering liquid to the spray frame under pressure, and a motor 23 operates the pump. The output side of the pump is connected to the spray frame by a flexible hose 24 which is attached to and communicates at its free end with an extension 26 of the spray frame. The inlet side of the pump is connected to a pipe 28 which communicates with city water in pipe 30 through a normally closed solenoid controlled valve 32. The pipe 28 also communicates with a tank 34 through a normally closed solenoid controlled valve 36. The tank is adapted to contain a detergent or soap solution. Water is supplied to the tank by a pipe 40 through a manually controlled valve 42.

The spray frame 10 is raised and lowered with respect to the vehicle to be washed by a hoist carried by the fixed frame 50 which includes the four stationary upright corner posts 51, 52, 53 and 54. These posts extend vertically, are anchored at their lower ends and are connected together at their upper ends by the frame members 55, 56, 57 and 58 to form a rigid structure. Associated with the corner posts 52 and 54 are the upright guide rods 59 and 60. The spray frame has a pair of rigid lateral extensions 61 and 62 each formed to provide a loop or an eye 63 on the free end, encircling and engaging the corresponding guide rod 59 or 60. Accordingly, the spray frame 10 is guided during its up and down movement so that it remains horizontal as it moves vertically.

The hoisting apparatus for raising and lowering the spray frame includes a pair of drums 65 and 66 secured to the opposite ends of a shaft 67 supported for rotation on the frame member 56. A cable 70 wound on each drum has its free end secured to one of the side members 16 or 18 near one end of the spray frame, and another cable 72 wound on each drum has its free end connected to the side members 16 and 18 near the opposite end thereof. The cables 72 are respectively trained over the idlers 74 carried by the frame member 58. Rotation of the drums 65 and 66 in one direction allows the cables to unwind and lowers the spray frame, and rotation in the opposite direction elevates the spray frame. A reversible motor 80 is provided to rotate the drums in opposite directions. The motor 80 operates through a speed reducer 82 to drive a pulley 84 on the output shaft of the speed reducer. A belt 86 extends over pulley 84 and over another pulley 88 on the shaft 67.

A normally closed limit switch LS1 on post 52 near the lower end thereof has its operating arm in position to be engaged and opened by the eye 63 carried by the spray frame. Operation of the limit switch is effective to discontinue the downward movement of the spray frame and, as will appear more fully hereinafter, in some instances to effect an immediate reversal and upward movement of the spray frame. Hence the limit switch LS1 determines the lower limit of movement of the spray frame, shown in FIG. 5. A second normally closed limit switch LS2 is carried by the post 52 near the upper end thereof, likewise having its operating arm in position to be engaged and opened by the eye 63 of the spray frame. When the limit switch LS2 is thus operated, the upward movement of the spray frame stops. Hence the limit switch LS2 determines the upper limit of the spray frame, shown in FIGURE 1.

Briefly, the automatic operation is as follows:

The cycle start button 90 is momentarily closed to initiate a complete cycle of operation, it being understood that the spray frame 10 is at this time at its upper limit shown in FIG. 1. The arrangement is such that the motor 80 is energized to lower the spray frame and at the same time the motor 23 is operated to deliver clear water to the spray frame through the solenoid operated valve 32. Hence the vehicle is thoroughly rinsed on all sides by jets of clear water. At the lower limit of its travel, the spray frame operates limit switch LS1 to reverse motor 80. Hence the spray frame immediately reverses and returns to its upper limit shown in FIG. 1. The water spray provided by the operation of pump 22 continues uninterrupted through the reversal and subsequent return of the spray frame to its upper limit. The upward movement of the spray frame is stopped by limit switch LS2 and the motor 80 is de-energized so that the spray frame dwells in its upper position for a brief period of time. At approximately the same time, the motor 23 is de-energized to stop the spray.

After a brief interval, sufficient to allow the water to penetrate the dirty film on the vehicle, the motor 80 is re-energized to lower the spray frame and at the same time the motor 23 is energized to this time pump a cleansing solution from the tank 34. Hence the vehicle is sprayed with a suitable detergent or soap solution. The spray frame dwells at its lower limit and the cleansing spray is shut off. The motors 80 and 23 are then re-energized to raise the spray frame and to again spray the vehicle with a cleansing solution from tank 34. The spray is shut off at the upper limit and the frame again dwells for a brief period. The dwells at the ends of the down and up movement of the spray frame allow the cleansing solution to penetrate the film of dirt on the vehicle.

Thereafter, the spray frame is again lowered and at its lower limit reverses and immediately is raised to its upper limit. During this complete down and up movement clear water is sprayed on the vehicle through the valve 32 to give the vehicle a final rinse and to wash away the cleansing solution. The cycle is then complete. The attendant must press the cycle start button 90 to run through another complete cycle.

Reference is now made to FIGURES 6 and 7 for a more complete description of the operation. As there shown, a timer motor M is provided which operates the switches SW1–5 in sequence. A clutch coil 94 is provided to reset the motor to initiate a cycle of operation. A double pole power switch 96 is provided in the lines 97 and 98 which lead from the current source and are connected across the terminal strip 100 through contacts 1c and 2c to lines 102 and 104. Lines 102 and 104 lead through the fuse box 106 to the power switch 96 and from there respectively to the terminal switch contacts 3c and 4c.

The timer motor M is diagrammatically illustrated in FIGURE 8 and includes a motor 110 which operates a plate 112. The motor 110 may drive the plate through any suitable connection, such as a rack and pinion, and serves to elevate the plate 112 from the starting position shown so that its operating edge 114 moves up across the switches SW1–5. The switches close when contacted by the edge 114 of the plate. The switches are thus closed in sequence to determine the cycle of operation. The FIG. 8 illustration is only diagrammatic but serves to illustrate the principle involved.

When the power switch 96 is closed, the red light 115 is energized across the terminals of the power switch. A cycle of operation may now be initiated by closing the cycle start button 90. As a result, current passes from terminal 4c of the terminal strip 100 through line 120 to one side of relays 1–4, to terminals MA and CA across the clutch coil 94 to the terminal CB and from there through the line 122 to the cycle start button 90. Since the cycle start button 90 is closed the circuit is completed through the line 124 and the normally closed contact 126 of relay 4 to the contact 3c of the terminal strip 100. Energization of the clutch coil operates the timer motor M to return or lower the plate 112 to the position shown in FIGURE 8 at which time the operating edge 114 thereof contacts and closes the switch SW1. Closing of switch SW1 closes the circuit to the timer motor M through the contacts MA, MB, 1A, 1B, 2B, 3B, 4B, 5B and back to contact 3c of the terminal strip through line 130. The switch SW1 remains closed through the entire cycle of operation so that the timer motor is energized to continuously and uniformly raise the plate 112. When switch SW1 closes the green light 132 is energized through lines 134 and 136 which lead through the switch SW1. Closing of switch SW1 also results in the energization of relay 4, thereby opening the contact 126 of the relay so that the cycle start button cannot again be operated during the cycle.

Continued operation of the timer motor M causes its plate 112 to engage and operate the switch SW2 to initate the first cycle of operation during which time the spray frame moves down and up and continuously sprays the vehicle with clear water. When switch SW2 is closed, relay 1 is energized through lines 120, 140 and 130. As a result, the normally open contacts 142, 144 and 146 of relay 1 are closed. Contact 142 effects the energization of the hoist motor through the reversing motor starter 150. As shown in FIGURE 7, power for the operation of the hoist motor is delivered through power lines L1–3, and the power circuit to the hoist motor is completed through the starter 150 and the up and down limit switches LS1 and LS2. Since the spray frame is initially at its upper limit, the limit switch LS2 is held open by the frame and the limit switch LS1 is closed. The starter circuit is therefore closed through the down limit switch LS1 via lines 154, 156, terminal 16c of the terminal strip 100, line 158, normally closed contact 160 of relay 3, line 162, normally closed contact 164 of time delay relay 166, terminal 15c of the terminal strip 100, lines 170, 171, 172, contact 142 of relay 1, terminal 11c of the terminal strip 100, and line 173 back to the motor starter. The hoist motor then operates to lower the spray frame.

The motor starter 174 for the pump motor 23 is operated to energize the pump motor at the same time that the starter 150 is operated. The power for operating the pump is through lines L4–6. The energization of relay 1 operates the starter 174 to energize the pump motor through the contact 144 of the relay which is now closed. As shown, the starter circuit includes the line 176 which extends to terminal 10c of the terminal strip 100 to the line 178 which connects with line 180 across the closed contact 144 of the relay and returns to the line 182 of the starter circuit across terminal 9c of the terminal strip 100. Thus the energization of relay 1 causes the pump motor to begin immediate operation.

The closing of contact 146 of relay 1 effects the immediate opening of the normally closed water valve 32 by the energization of its solenoid. As shown, the circuit to the water valve solenoid is from terminal 4c of the terminal strip through line 186 and across terminal 8c through line 188, line 190, across terminal 7c and line 192 to the contact 146 of the relay. From there the circuit leads to terminal 3c through line 196.

Hence upon the initial energization of relay 1, the hoist motor 80 is operated to lower the spray frame and the pump motor is operated to spray clear water on the vehicle during the downward movement of the spray frame through the water valve 32.

When the spray frame reaches its lower limit, it engages and opens the time limit switch LS1. However, the up limit switch LS2 is now closed, having closed upon initial downward movement of the spray frame. The circuit to the hoist motor is therefore reversed, the circuit running from line 173 through terminal 11c of the terminal strip across the closed contact 142 of relay 1 through lines 172, 171 and 200 across normally closed contact 202 of relay 2, through line 204 across terminal 14c and back to the up limit switch LS2 on line 208. Hence the hoist motor reverses without any interruption or delay to elevate the spray frame.

The time delay relay 166 is energized upon the closing of switch SW2 and is set to open its contact 164 after the spray frame has reversed and is travelling upwardly. Accordingly, the circuit to the reversing motor starter 150 through the down limit switch LS1 is now opened at contact 164. This has no effect on the upward movement of the spray frame since the circuit is through the up limit switch LS2. However, when the spray frame reaches its upper limit, opening the up limit switch LS2, the hoist motor cannot reverse because the circuit through the down limit switch LS1, which closed upon initial upward movement of the spray frame, is open at contact 164 in the time delay relay. Hence the spray frame will dwell at its upper limit.

The water solution will continue to be sprayed from the nozzles of the spray frame until the switch SW2 opens, and this takes place when the lower edge 114 of plate 112 rises above switch SW2. When switch SW2 opens, relay 1 is de-energized, opening the contacts 142, 144 and 146 to open the circuit to the motor starter 174 thereby de-energizing the pump motor and at the same time de-energizing the solenoid of water valve 32 allowing it to close. The arrangement is such that water is sprayed from the frame for only a brief period after the frame reaches its upper limit.

The spray frame dwells at its upper limit for a predetermined period of time to permit the water to soak into the film of dirt on the vehicle. After the dwell period has elapsed, which might be 30 to 60 seconds, the lower edge 114 of the continuously rising plate 112 engages and closes switch SW3 to close the circuit across relay 2 through lines 210 and 130. The time delay relay 166 is not energized during the time the switch SW3 is closed. Energization of relay 2 opens its contact 202 and closes contacts 214, 216 and 218. When contact 214 closes, it closes the circuit through the closed down limit switch LS1 in the same manner as relay 1 performed this function since contact 214 is wired in parallel with contact 142 of relay 1. This circuit runs through the normally closed contact 160 of relay 3 and through the closed contact 164 of the de-energized time delay relay 166. Hence the spray frame moves downward again. The circuit to the pump motor starter 174 through lines 176 and 182 is closed through the same circuit as before, except that it runs through contact 216 of relay 2 rather than through contact 144 of relay 1, these contacts being in parallel circuits. The valve 36 for the cleansing solution of soap or the like in tank 34 is opened by energization of its solenoid across the closed contact 218 of relay 2. The circuit from the power switch 96 runs through terminal 4c and line 186 across terminal 6c to the solenoid valve 36 and then through line 220 across terminal 5c through line 222 across contact 218 and then back through line 224 and across terminal 3c to the power switch. Hence at the same time the hoist motor is energized to lower the spray frame, the solenoid valve 36 is opened and the pump motor 23 is energized to spray the vehicle with a detergent or the like during the descent of the spray frame.

When the spray frame reaches its lower limit the down switch LS1 is opened. The up limit switch LS2 closed upon the initial descent of the spray frame but the circuit to the reverse motor starter 150 through the up limit switch is opened by contact 202 of relay 2. Hence the spray frame dwells in the lower position. When the plate 112 of the timer motor rises above switch SW3, this switch is opened. Opening of switch SW3 de-energizes relay 2 and simultaneously opens the circuits to the solenoid valve 36 and to the motor starter 174. Hence the spray stops. This takes place very shortly after the spray frame reaches its lower limit.

The spray frame dwells at its lower limit until switch SW4 is closed by plate 112 of the timer motor. The delay between the opening of switch SW3 and the close of SW4 may be any predetermined period for time, for example 30 to 60 seconds, to allow the washing solution of soap or detergent to penetrate. When switch SW4 is closed the circuit for relay 3 is closed through line 230. As a result, the normally closed contact 160 opens and contacts 232, 234 and 236 close. Closing of contact 232 completes the circuit through the closed up limit switch LS2. This circuit runs from line 173 across terminal 11c to contact 232, and from there through lines 172, 171 and 200 across the normally closed contact 202 of de-energized relay 2, and then back to the up limit switch LS2 through lines 204, 208 and terminal 14c. The contact 236 closes the circuit to the solenoid valve 36 through substantially the same circuit as before since contact 236 is in parallel with contact 218 of relay 2. Contact 234 closes the circuit to the motor starter 174 of the pump motor through substantially the same circuit as before since contact 234 is wired in parallel with contact 216 of relay 2. Hence the spray frame moves up and at the same time the detergent solution is again sprayed on the body of the vehicle. When the spray frame reaches its upper limit, the circuit to the motor starter through the up limit switch LS2 is opened. While the down limit switch was closed upon the initial rise of the spray frame, the circuit to this limit switch is opened by contact 160 of relay 3. Hence the spray frame will dwell in its upper position. Shortly thereafter the plate 112 will open switch SW4 to de-energize relay 3 and open contacts 232, 234 and 236 and close contact 160. As a result, the spray is stopped by de-energization of the pump motor and closing of valve 36. This takes place a very short time after the spray frame reaches its upper limit.

The period between the opening of switch SW4 and the closing of switch SW5 may be any predetermined interval, for example 30 to 60 seconds, to allow the cleansing solution to penetrate. When switch SW5 is closed, the relay 1 is again energized. It will be noted that switch SW5 is in parallel with switch SW2 so that switch SW5 will put the apparatus through the rinsing cycle once again, in the same manner that this was carried out initially by the switch SW2. In other words, the spray frame will descend, reverse at its lower limit and immediately return to its upper limit where it will remain; and during the entire descent, reversal and rise of the spray frame the vehicle will be sprayed with clear water. The switch SW5 will then open and switch SW1 will open to complete the cycle. Opening of switch SW1 de-energizes the timer motor and de-energizes the circuit to the green light 132.

In order to repeat the cycle, it is necessary for the operator to again depress the cycle start button 90 to energize the clutch coil 94, resetting the timer motor and closing the circuit to the timer motor M through switch SW1.

The switches SW1–5 may of course be adjusted to vary the dwells in the cycle, as desired.

What I claim as my invention is:

1. A vehicle washer comprising a spray frame, power means for reciprocating said spray frame in opposite directions between limits to spray a vehicle, means for supplying a first liquid to said spray frame during movement thereof toward one limit, means for supplying a second liquid to said spray frame during movement thereof toward the other limit, and means operative automatically at said one limit of reciprocation of said frame to deactuate said first liquid supply means and to actuate said second liquid supply means.

2. A vehicle washer comprising a spray frame, power means for reciprocating said spray frame in opposite directions between limits to spray a vehicle, control means for actuating said power means to operate said spray frame through a predetermined cycle of operation and for automatically temporarily deactuating said power means when said spray frame is at one limit to provide a temporary dwell in the reciprocation of said spray frame, means for supplying a first liquid to said spray frame during movement thereof toward said one limit, means for supplying a second liquid to said spray frame during movement thereof toward said other limit, and means operative automatically at said one limit of reciprocation of said spray frame to deactuate said first liquid supply means at approximately the beginning of said dwell and to actuate said second liquid supply means at approximately the end of said dwell.

3. The vehicle washer defined in claim 2 wherein the first liquid is a cleaning liquid and the second is rinse water.

4. A vehicle washer comprising a spray frame, power means for reciprocating said spray frame in opposite directions between limits to spray a vehicle, control means for actuating said power means to operate said spray frame through a predetermined cycle of operation and for automatically temporarily deactuating said power means when said spray frame is at one limit to provide a temporary dwell in the reciprocation of said spray frame, means for supplying a liquid to said spray frame during movement thereof in both directions, and means automatically operated at said one limit and during the dwell in the reciprocation of said spray frame for deactuating said liquid supply means.

5. A vehicle washer comprising a spray frame, power means for reciprocating said spray frame in opposite directions between limits to spray a vehicle, control means for actuating said power means to operate said spray frame through a predetermined cycle of operation and for automatically temporarily deactuating said power means when said spray frame is at one limit to provide a temporary dwell in the reciprocation of said spray frame, means for supplying first and second liquids to said spray frame, means for actuating said first liquid supply means prior to said dwell, and means for automatically deactuating said first liquid supply means at said one limit at approximately the beginning of said dwell and actuating said second liquid supply means at the end of said dwell.

6. The vehicle washer defined in claim 5 wherein said first liquid is a cleaning liquid and the second is rinse water.

7. A vehicle washer comprising a spray frame, power means for reciprocating said spray frame in opposite directions between limits to spray a vehicle, control means for actuating said power means to operate said spray frame through a predetermined cycle of operation and for automatically temporarily deactuating said power means when said spray frame is at both limits to provide temporary dwells in the reciprocation of said spray frame, means for supplying liquid to said spray frame during its movement, and means for deactuating said liquid supply means during the dwells.

8. A vehicle washer comprising a spray frame, power means for reciprocating said spray frame in opposite directions between limits to spray a vehicle, control means for actuating said power means to operate said spray frame through a predetermined cycle of operation and for automatically temporarily deactuating said power means when said spray frame is at both limits to provide temporary dwells in the reciprocation of said spray frame, means for supplying a first liquid to said spray frame prior to a first dwell and after a second dwell, means for supplying a second liquid to said spray frame between said first and second dwells, and means for deactuating both said first and second liquid supply means during each of said dwells so that at both dwells neither one of said supply means is operative.

9. A vehicle washer comprising a spray frame, power means for reciprocating said spray frame in opposite directions between limits to spray a vehicle, control means for actuating said power means to operate said spray frame through a predetermined cycle of operation and for automatically temporarily deactuating said power means when said spray frame is at both limits to provide temporary dwells in the reciprocation of said spray frame, means for supplying rinse water to said spray frame prior to a first dwell and after a second dwell, means for supplying a cleaning liquid to said spray frame between said first and second dwells, and means for deactuating both said supply means during each of said dwells so that at both dwells neither one of said supply means is operative.

10. The vehicle washer defined in claim 9 wherein another dwell in the reciprocation of said spray frame is provided at one of said limits between said first and second dwells, and means are provided for deactuating said supply means for the cleaning liquid during said other dwell.

11. A vehicle washer comprising a spray frame, power means for moving said spray frame in opposite directions between limits to spray a vehicle, control means for temporarily deactuating said power means when said spray frame is at one limit to provide a temporary dwell in the movement of said spray frame, means for supplying liquid to said spray frame during its movement, and means operative automatically to deactuate said liquid supply means at approximately the beginning of said dwell and to reactuate the same at approximately the end of said dwell.

12. A vehicle washer comprising a spray device, power means for moving said spray device in opposite directions between limits to spray a vehicle, control means for temporarily deactuating said power means when said spray device is at one limit to provide a temporary dwell in the movement of said spray device, time delay means operative in timed relation with said control means for actuating said power means at the end of said dwell, means for supplying liquid to said spray device during its movement, and means operative in timed relation with said control means and time delay means for deactuating said liquid supply means during said dwell.

References Cited in the file of this patent
UNITED STATES PATENTS

| | | |
|---|---|---|
| 2,390,757 | Voris | Dec. 1, 1945 |
| 2,689,577 | Dunn | Sept. 21, 1954 |
| 2,756,759 | Swain | July 31, 1956 |